United States Patent
Huhtasalo

(10) Patent No.: US 11,881,126 B2
(45) Date of Patent: Jan. 23, 2024

(54) BAGGAGE TAG

(71) Applicant: Digital Tags Finland Oy, Tampere (FI)

(72) Inventor: Lauri Huhtasalo, Tampere (FI)

(73) Assignee: Digital Tags Finland Oy, Tampere (FI)

( * ) Notice: Subject to any disclaimer, the term of this patent is extended or adjusted under 35 U.S.C. 154(b) by 0 days.

(21) Appl. No.: 17/688,306

(22) Filed: Mar. 7, 2022

(65) Prior Publication Data

US 2022/0309960 A1 Sep. 29, 2022

(30) Foreign Application Priority Data

Mar. 26, 2021 (SE) .................................... 2150361-0

(51) Int. Cl.
*G09F 3/03* (2006.01)
*G06K 19/07* (2006.01)
(Continued)

(52) U.S. Cl.
CPC ....... *G09F 3/0335* (2013.01); *G06K 19/0723* (2013.01); *G06K 19/0776* (2013.01);
(Continued)

(58) Field of Classification Search
CPC . G09F 3/0335; G09F 3/04; G09F 3/10; G09F 2003/0254; G09F 3/0297; G06K 19/0723; G06K 19/0776; G06K 19/07775; G06K 19/07722; G06K 19/07; G06K 19/025; G06K 19/077; H01Q 1/22
See application file for complete search history.

(56) References Cited

U.S. PATENT DOCUMENTS 6,222,452 B1  4/2001 Ahlstrom et al.
7,817,045 B2 * 10/2010 Onderko .......... G06K 19/07758
340/572.8

(Continued)

FOREIGN PATENT DOCUMENTS

EP    0595549 A2   5/1994
EP    1018702 A1   7/2000
(Continued)

OTHER PUBLICATIONS

European Search Report for Application No. 22163707 dated Aug. 12, 2022 (2 pages).

(Continued)

*Primary Examiner* — Cassandra Davis
(74) *Attorney, Agent, or Firm* — Merchant & Gould P.C.

(57) ABSTRACT

The present invention relates to a baggage tag (1) to be fastened to a luggage, such that the luggage can be tracked and traced via the baggage tag. The baggage tag comprising a face material (5) with a first side (6) and a second side (7). A liner (8) with a first side (9) and a second side (10), wherein the first side is siliconized and facing against the second side (7) of the face material (5); and a pressure sensitive adhesive layer (11), which is arranged between the second side of the face material and the first side of the liner. The baggage tag further comprising an RFID tag which tag comprises an RFID antenna (3) and an IC (4) attached onto the antenna such that the antenna and the IC form the RFID tag and wherein the RFID antenna is formed directly onto the second side of the liner.

7 Claims, 1 Drawing Sheet

Figure 1:
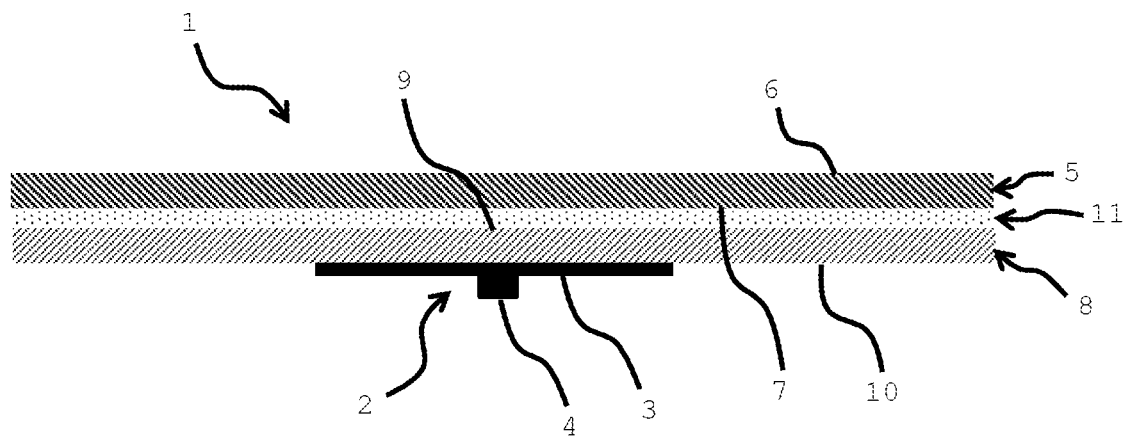

(51) Int. Cl.
  *G06K 19/077*  (2006.01)
  *G09F 3/04*  (2006.01)
  *G09F 3/10*  (2006.01)
  *G09F 3/02*  (2006.01)

(52) U.S. Cl.
  CPC ......... *G06K 19/07775* (2013.01); *G09F 3/04* (2013.01); *G09F 3/10* (2013.01); *G09F 2003/0254* (2013.01)

(56) References Cited

U.S. PATENT DOCUMENTS

| | | | |
|---|---|---|---|
| 2008/0296886 A1 | 12/2008 | Minor et al. | |
| 2010/0066538 A1* | 3/2010 | Ogata | G09F 3/16 156/268 |
| 2022/0207313 A1* | 6/2022 | Huijsing | B64D 11/003 |

FOREIGN PATENT DOCUMENTS

| | | | |
|---|---|---|---|
| EP | 1437682 A1 | 7/2004 | |
| JP | 2008299603 A | * | 12/2008 |
| JP | 2010231028 A | 10/2010 | |

OTHER PUBLICATIONS

Swedish Search Report for SE Application No. 2150361-0 dated Nov. 23, 2021 (6 pages).

* cited by examiner

BAGGAGE TAG

CROSS-REFERENCE TO RELATED APPLICATIONS

This application claims priority benefit of Serial No. 2150361-0, filed Mar. 26, 2021 in Sweden, and which application is incorporated herein by reference. To the extent appropriate, a claim of priority is made to the above-disclosed application.

TECHNICAL FIELD

The present invention relates to a baggage tag to be wrapped around and fastened to a luggage, such that the luggage can be tracked and traced via the baggage tag, the baggage tag comprising:
- a face material made of paper with a first side and a second side;
- a liner with a first side and a second side, wherein the first side is siliconized and facing against the second side of the face material; and
- a pressure sensitive adhesive layer, which is arranged between the second side of the face material and the siliconized first side of the liner.

In the following the expression "RFID" (Radio Frequency Identification) tag will be frequently used. An RFID tag is a tag that is intended to be attached onto objects to be identified in a radio-frequency identification system.

An RFID tag comprising an RFID antenna and an IC (integrated circuit or microchip), which IC is electrically connected onto the antenna.

Moreover, the expression "luggage" will be frequently used. In this context the expression covers all types of luggage that a passenger at an airport may check-in before he enters an aircraft. Examples of such luggage may be any of the following objects: bag, suitcase, backpack, box, bike, stroller, skis or similar.

PRIOR ART—PROBLEM

Generally, when a passenger checks-in her or his luggage with an airline, a baggage tag is generated and attached to the luggage. The baggage tag includes an original luggage number along with customer information and routing information relating to an itinerary of the passenger. The baggage tag is used by a baggage sortation system. Generally, the baggage sortation system aids in loading the luggage onto the same aircraft as the passenger, and thus the luggage arrives with the passenger at the destination of the passenger.

A conventional baggage tag with an RFID tag comprising a face material made of paper which has a laminated plastic layer to bring tear resistance to the baggage tag. This prevents the tag to be torn and falling off the baggage during handling. The face material has a direct thermal printable coating on the face side of the paper. This is direct thermal printed with heat at airport baggage tag printing stations. The baggage tag further comprising a pressure sensitive adhesive (PSA) layer. This layer is used to affix the baggage tag into a loop form after it has been wrapped around the handle of the luggage.

Moreover, the tag comprising a siliconized liner, which covers the PSA layer. The liner is partially peeled off when the baggage tag is wrapped around a luggage handle, exposed PSA will attach to the back side of the liner. Before the liner is laminated with the face material, a converting company inserts an RFID wet inlay on top of the backing liner and then laminates the face material on top. Hence, the RFID wet inlay gets encapsulated in the middle of the baggage tag.

RFID wet inlays have an adhesive backing making them easy to stick on to surfaces. An RFID wet inlay comprises an integrated chip (IC) with an RFID antenna. RFID Wet Inlays are like RFID stickers and are ideal for applications which require a "peel and stick" type of tag.

However, these conventional baggage tags with RFID wet inlays have some drawbacks:
- RFID wet inlay is made of fossil materials (PET substrate, PU adhesive and PET face material).
- RFID wet inlays have a siliconized liner paper just for handling purposes which liner will be thrown away (wasted) during converting.
- The RFID wet inlay comprises an extra PSA layer which is only needed for fasten the RFID inlay to the baggage tag.
- Aluminum etching process uses lot of water, electricity, harmful chemicals and causes chemical etching waste.
- In baggage tag converting process, extra process steps and equipment are needed to insert RFID wet inlays into the material stack.

OBJECT OF INVENTION

An object with the invention is to provide a more environmentally friendly RFID baggage tag which is more cost efficient in comparison to prior art, requires fewer converting steps and in turn solves the above-mentioned problems.

SUMMARY OF THE INVENTION

In accordance with the invention, the baggage tag is characterized in that the baggage tag further comprising an RFID tag which tag comprises an RFID antenna and an IC, which IC is attached onto the antenna such that the antenna and the IC form the RFID tag and wherein the RFID antenna is formed directly onto the non-siliconized second side of the liner.

FIGURES AND DETAILED DESCRIPTION OF THE INVENTION

FIG. 1 discloses a schematic view of a baggage tag in accordance with the invention.

Figure 2:
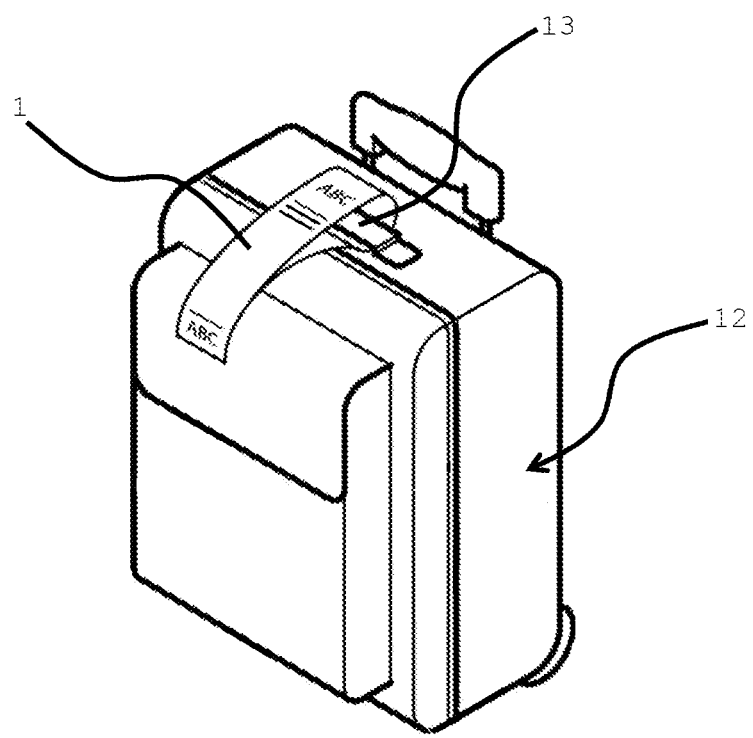

FIG. 2 discloses how the inventive baggage tag is wrapped around and attached to a luggage.

In the following, the invention will be described more in detail with reference to FIGS. 1 and 2. The invention discloses an elongated baggage tag 1 to be wrapped around and fastened to a luggage 12, such that the luggage 12 can be tracked and traced via the baggage tag 1. The elongated baggage tag is typically about 500 mm long and about 54 mm wide. However, the skilled person realizes that the inventive baggage tag 1 is not limited to these specific sizes.

The baggage tag 1 comprising an elongated face material 5 made of paper with a first side 6 and a second side 7, which second side 7 faces away from the first side 6.

In a preferred embodiment, the first side 6 is coated with a direct thermal printable coating. This is direct thermal printed with heat at the airport baggage tag printing stations.

In a yet more preferred embodiment, the second side 7 is laminated with a polypropylene (PP) film or a polyethylene terephthalate (PET) film to bring tear resistance to the baggage tag 1.

However, the skilled person realizes that is not essential for the invention to laminate the second side 7. It is obvious that there are other possible solutions to bring tear resistance to the tag, e.g. lamination of the first side 6 or by using a more tear resistant paper with no additional lamination at all.

The baggage tag 1 further comprising a liner 8 with a first side 9 and an opposite second side 10 which faces away from the first side 9. The liner 8 is preferably made of a non-plastic material, preferably paper.

The first side 9 is siliconized, i.e. the side has been coated or treated with silicon, such that the side has non-sticky properties. The second side 10 is untreated or non-siliconized, i.e. it has not been siliconized.

The siliconized first side 9 of the liner 8 is facing against the second side 7 of the face material 5.

Further, the baggage tag 1 comprising a pressure sensitive adhesive layer 11 which is arranged between the second side 7 of the face material 5 and the siliconized first side 9 of the liner 8.

The baggage tag 1 further comprising an RFID tag 2 which tag comprises an RFID antenna 3 and an integrated chip (IC) 4. The IC is electrically connected to the antenna such that the antenna and the IC forms the RFID tag. The RFID antenna 3 is formed directly onto the non-siliconized second side 10 of the liner 8.

The skilled person realizes that many ways are possible to form the RFID tag directly onto the second side 10 of the liner 8. In a preferred first embodiment, of forming the antenna, electrically conductive solid particles are formed, in a predefined pattern, onto the second side 10 of the liner 8.

The conductive material is then cured to form a solidified, more compact antenna pattern. This can e.g. be made by application of heat with a suitable heater. Hereby, the conductive material is preferably heated to a temperature exceeding a characteristic melting temperature of the conductive material.

The transfer of the conductive particles and the curing and solidification may be made in the way disclosed in one or several of the WO2013/113995, WO2009/135985 WO2008/006941 and WO2016/189446. All said documents hereby being incorporated in their entirety by reference.

Further, other ways of forming the conductive material in a pattern can also be used. In a second embodiment the forming of the RFID antenna can be made by additive printing with a conductive ink. A conductive ink is an ink comprising conductive particles. The conductive ink can for example be silver ink, copper ink or graphene ink. The conductive inks are then made conductive by drying them or treating them with hot-air, radiation (UV, EB), photonic curing, laser or some other treatment method.

In a third embodiment the forming of the RFID antenna is made by first providing the second side with a conductive layer, preferably an aluminum foil. Parts of the conductive layer is then subtracted, such that the remaining conductive layer, on the liner, forms the RFID antenna. The subtraction of the conductive layer into the desired conductive pattern could for example be through cutting, grinding, brushing, etching or the like.

Thereafter, the method comprising the step of attaching the RFID IC onto the antenna 3, such that, an electrical connection between the IC 4 and the antenna is established, wherein the RFID tag 2 is formed.

In use, when the baggage tag 1 is wrapped around and fastened to a luggage 12, a portion of the siliconized liner 8 is peeled off from the adhesive layer 11, such that a portion of the adhesive layer 11 is exposed. The portion of the exposed adhesive layer 11 is then fastened against a portion of the non-siliconized second side 10 of the liner 8. FIG. 2 discloses an embodiment where the luggage 12 is a bag 12 and wherein the baggage tag 1 is wrapped around and fastened to a handle 13 of the bag 12. A part of the baggage tag forms a loop wherein the handle 13 of the luggage 12 is located within the loop.

There are several benefits with the present invention in comparison to a conventional baggage tags with RFID tag. Since, the RFID antenna 3 in accordance with the invention is printed directly onto the second side 10 of the liner 8, there is no need for an RFID wet inlay. This results in the following benefits:

Less process steps and equipment are needed to insert RFID tag into the material stack.

Less fossil materials are used, since RFID wet inlays comprising PET substrate, PU adhesive and PET face material.

No extra siliconized layer for handling purposes and will be thrown away (wasted) during converting.

No extra PSA layer is needed for fasten the RFID inlay to the baggage tag.

In baggage tag converting process, extra process steps and equipment are needed to insert RFID wet inlays into the material stack. In the proposed method these process steps and equipment are not needed.

In the foregoing, the invention has been described based on some specific embodiments. However, a person skilled in the art realizes that other embodiments and variants are possible within the scope of the following claims.

The invention claimed is:

1. A baggage tag to be wrapped around and fastened to a luggage, such that the luggage can be tracked and traced via the baggage tag, the baggage tag comprising:
   a face material made of paper with a first side and a second side;
   a liner with a first side and a second side, wherein the first side of the liner is siliconized and facing against the second side of the face material, and the second side of the liner is non-siliconized; and
   a pressure sensitive adhesive layer, which is arranged between the second side of the face material and the siliconized first side of the liner;
wherein the baggage tag further comprising an RFID tag, wherein the RFID tag comprises an RFID antenna and an integrated chip, the integrated chip is attached onto the antenna such that the antenna and the integrated chip form the RFID tag and wherein the RFID antenna is formed directly onto the non-siliconized second side of the liner.

2. The baggage tag according to claim 1, wherein the first side of the face material has a direct thermal printable coating.

3. The baggage tag according to claim 1, wherein the second side of the face material is laminated to provide tear resistance to the baggage tag.

4. The baggage tag according to claim 1, wherein the liner is made of paper.

5. The baggage tag according to claim 1, wherein the RFID antenna is formed by an antenna pattern of electrically conductive solid particles heated to a temperature exceeding a characteristic melting point of the electrically conductive solid particles.

6. The baggage tag according to claim 1, wherein the RFID antenna has been produced by additive printing, wherein the antenna has been printed with a conductive ink.

7. The baggage tag according to claim 1, wherein the liner is laminated with a conductive layer and wherein the RFID is formed by using subtractive manufacturing, wherein parts of the conductive layer is subtracted, such that the remaining conductive layer on the liner forms the RFID antenna.

\* \* \* \* \*